United States Patent [19]

Chapoy et al.

[11] Patent Number: 4,978,735

[45] Date of Patent: Dec. 18, 1990

[54] THERMOTROPIC LIQUID CRYSTALLINE AROMATIC POLYESTER FROM 3,3'-DIPHENYL-4,4'-DIHYDROXY DIPHENYL

[75] Inventors: L. Lawrence Chapoy, Lesa; Alfredo Coassolo; Marco Foá, both of Novara, all of Italy

[73] Assignee: Himont Italia S.r.l., Milan, Italy

[21] Appl. No.: 402,348

[22] Filed: Sep. 5, 1989

[30] Foreign Application Priority Data

Sep. 7, 1988 [IT] Italy ............................. 21843 A/88

[51] Int. Cl.$^5$ ..................... C08G 63/54; C08G 63/18; C08G 63/00; C08G 63/02
[52] U.S. Cl. ................................. 528/193; 528/176; 528/192; 528/271; 528/272
[58] Field of Search ............... 528/176, 192, 193, 271, 528/272

[56] References Cited

U.S. PATENT DOCUMENTS

| | | | |
|---|---|---|---|
| 4,536,561 | 8/1985 | Schmidt et al. | 528/193 |
| 4,667,011 | 5/1987 | Eckhardt et al. | 528/128 |
| 4,701,515 | 10/1987 | Dicke et al. | 528/176 |

*Primary Examiner*—Harold D. Anderson
*Assistant Examiner*—T. Mosley
*Attorney, Agent, or Firm*—Stevens, Davis, Miller & Mosher

[57] ABSTRACT

Thermotropic liquid crystalline aromatic polyesters of 3,3'-diphenyl-4,4'-dihydroxydyphenyl containing units derived from mono-substituted hydroquinones in amounts over 10% by moles with respect to the total of the aromatic diols.

10 Claims, No Drawings

THERMOTROPIC LIQUID CRYSTALLINE AROMATIC POLYESTER FROM 3,3'-DIPHENYL-4,4'-DIHYDROXY DIPHENYL

The present invention relates to thermotropic liquid crystalline aromatic polyesters.

More particularly, the present invention relates to thermotropic liquid crystalline aromatic polyesters, which can be easily processed in the melted state and which contain a mesogen group in the main chain.

Thermotropic polyesters, showing therefore optic anisotropy in the melted state, are known products, which are described in numerous examples in the literature, such as British Polymer Journal (Dec. 1980) page 154: "Liquid Crystal Polymer"; Journal of Macromolecular Science Chemistry (19S4) page 1705: "Liquid Crystalline Aromatic Polyesters"; Die Augewandte Makromolekulare Chemie (1982), 109–110 page 1 "Rigid chain Polymers"; Die Augewandte Makromolekulare Chemie (1986), 145–146 page 231:"Thermotropic Liquid Crystalline Polymers"; Journal of Molecular Science Review (1986) C26(4) page 551: "Liquid Crystalline Polymers": a hovel state of material".

By using such polyesters we can obtain fibres from the melted state, having high toughness or, we can obtain molded articles, for instance by injection, having characteristics of suitable stiffness, hardness and toughness.

The polymers having the above mentioned properties, can be generally processed easily in the melted state, they are highly heat- and oxidation-resisting and moreover present high mechanical characteristics and resistance against the solvent etching.

In U.S. Pat. No. 3,637,595 the preparation is described of thermotropic liquid crystalline polyesters by polycondensation of 4,4'-dihydroxydiphenyl, terephthalic acid and p-hydroxybenzoic acid. The thus obtained polymer, although it has high mechanical characteristics and is oxidation and solvent etching resisting, presents high melting point, over 420° C., and therefore it can be processed with difficulty or anyhow it requires unusual apparatuses for the injection molding.

In U.S. Pat. No. 3,975,487 the above mentioned drawback was overcome partly, by using bent comonomers such as isophthalic acid, whose presence, however, if in high amounts, can lead to the destruction of the liquid crystalline characteristics of the finished polymer.

In Journal of Polymer Science: Polymer Physic Edition vol. 21, 1119 the preparation is described of polyesters, starting from 4,4'-dihydroxydiphenyl and various aliphatic diacids; such polymers, however, owing to the presence of compounds with an aliphatic chain, have not very interesting physical-mechanical properties.

In U.S. Pat. No. 4,617,370 the preparation is described of liquid crystalline polymers, starting from 4,4'-dihydroxydiphenyl substituted in positions 3,3', 5,5'either with phenyl, or with alkyl or with alkoxyl radicals having a low number of carbon atoms and in at least one of positions 2,2', 6,6' with a halogen atom.

This monomeric unit is made react with dicarboxylic aromatic acids and with hydroxyaromatic acids and the obtained polymer has a melting point ranging from 270 to 350° C.

However, according to this patent, a polymer with liquid crystalline properties can be obtained, only if a hydroxyaromatic acid is used in the polymerization mixture, otherwise the obtained polymer presents an isotropic melted state.

In European Pat. application No. 201,831 thermotropic liquid crystalline polyesters are described, which are obtained by polycondensation of a dicarboxylic aromatic acid and of 4,4'-dihydroxydiphenil substituted in positions 3 and 3' with two phenyl groups.

Such polymers have a high melting point about 390° C. and therefore they can be processed with difficulty. This melting point can be lowered, but only up to values about 360° C., when one operates with 3,3'-diphenyl-4,4'-dihydroxydiphenyl in the presence of other aromatic diols up to 10% by moles.

The Applicant has now found that liquid crystalline polymers can be obtained, containing the unit derived from 3,3'-diphenyl-4,4'-dihydroxydiphenyl, having a melting point ranging from 220° to 320° C. and a temperature of glass transition over 140° C., if the synthesis of the aromatic polyester is carried out in the presence of substantial amounts (over 10% by moles) of mono - substituted hydroquinones.

In such a way the aim is reached to obtain polymers, which can be processed with more ease and can be used, with more ease, in mixtures with other thermoplastic matrices and moreover a considerable economic advantage is achieved, as well, by replacing a monomer, which is not synthesized easily, and consequently is expensive, such as 3,3'-diphenyl-4,4'-dihydroxydihphenyl, with other monomers, which can be obtained easily, and are often already available on the market, such as monomsustituted hydroquinones.

Therefore, the object of the present invention consists in the thermotropic liquid crystalline polyesters comprising:

(a) 30–90% by moles, with respect to the total of the aromatic diols, of a unit derived from 3,3'-diphenyl-4,4'-dihydroxydiphenyl of general formula:

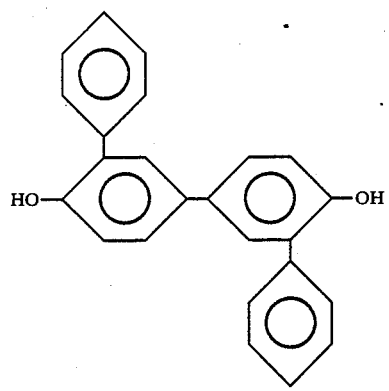

(1)

(b) 70–10% by moles of at least a unit derived from hydroquinones of general formula:

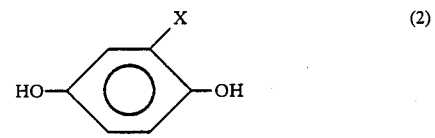

(2)

wherein X represents a halogen or an alkyl radical having from 1 to 6 carbon atoms, an aralkyl radical containing at least 7 carbon atoms, preferably from 7 to 15 carbon atoms, an aryl radical containing from 6 to 18 carbon atoms or a cycloalkyl radical containing from 6 to 12 carbon atoms;

(c) at least a unit derived from bicarboxylic acids having general formula:

HOOC—R$_1$—COOH wherein R$_1$ represents a cycloalkyl, a simple, double or condensed aryl radical containing from 6 to 18 carbon atoms, optionally substituted with groups which are inert under the reaction conditions, such as halogens or alkyl radicals having a low number of carbon atoms;

(d) optionally at least a unit derived from hydroxyaoids having general formula:

HO—Ar$_1$—(CH=CH)$_n$—COOH     (4)

wherein Ar$_1$ represents a simple, double or condensed aryl radical containing from 6 to 18 carbon atoms, optionally substituted with groups which are inert under the reaction conditions, such as halogens or alkyl radicals having a low number of carbon atoms and n is equal to zero or to 1.

The molar ratio between hydroxyacid and bicarboxylic acid can vary within wide limits and it generally ranges from 0 to 4, more preferably from 1 to 2.

With the term alkyl radicals having a low number of carbon atoms, as used in the present disclosure and claims, the alkyl radicals are meant containing from 1 to 4 carbon atoms.

According to a preferred embodiment of the polyesters object of the present invention, at least 90% by moles of the products of general formula (3) and (4) has the two functional groups such as to form the polymeric chain with substantially coaxial or parallel direction.

According to a further embodiment of the polyesters object of the present invention the unit derived from 3,3'-diphenyl-4,4'-dihydroxydiphenyl is present in amounts ranging from 30 to 60% by moles with respect to the global amount of the aromatic diols.

Examples of hydroquinones of general formula (2) are: methyl, ethyl, propyl, t-butyl hydroquinone, phenyl hydroquinone, (1-phenylethyl)hydroquinone, (alpha-phenylisopropyl)hydroquinone, cyclohexylhydroquinone, chlorohydroquinone and so on.

Examples of bicarboxylic aromatic acids are: terephthalic acid, chloro, bromo-terphthalic acid, methylterephthalic acid, 1,4-naphthalenedicarboxylic, 1,5-naphthalenedicarboxylic and 2,6-naphthalenedicarboxylic acids, 4,4'-diphenyldicarboxylic acid, 3,3'-dibromo-4,4-diphenyldicarboxylic acid, 4,4'-stilbenedicarboxylic acid and so on.

Examples of hydroxy acids are: p-hydroxybenzoic acid, 3-chloro-4-hydroxybenzoic acid, 3-bromo-4-hydroxybenzoic acid, 3,5-dichloro-4-hydroxybenzoic acid, 3-methyl-4-hydroxybenzoic acid, 3-t-butyl-4-hydroxybenzoic acid, 4-hydroxy-l-naphthoic acid, 6-hydroxy-2-naphthoic acid, p-(4-hydroxyphenyl)benzoic acid, p-hydroxycinnamic acid and so on.

The polymers object of the present invention are optically anisotropic in the melted state, as it is possible to ascertain by optical microscopy analysis with polarized light, and have inherent viscosity, measured in 1/1 trifluofoacetic acid and methylene chloride mixture at 30° C. at a concentration of 2.5 g/l, ranging from 0.3 to 4 dl/g.

Molecular weight and crystallinity can be increased by heating the particles of the polymer either in an inert environment or under vacuum at a temperature very little below the melting point for a time ranging from 1 to 20 hours.

The polyesters object of the present invention are suitable to be utilized for obtaining formed bodies, which can be prepared by the customary technologies of transformation of the thermoplastic polymers such as, for instance injection molding or extrusion. Said polyesters can be processed in the form either of film or of fibre, can be utilized as matrices for composite materials based on fibres or inorganic fillers and can be used in mixture with other polymers.

The preparation of the liquid crystalline aromatic polyesters object of the present invention can be carried out according to customary technics, reacting the above mentioned units, which are available on the market or can be prepared easily, according to usual technics of organic chemistry, under the customary conditions of preparation of the polyester resins.

For instance said polyesters can be obtained in the melted state or in the presence of a dispersing agent, having high boiling point, such as diphenylsulfone or mixtures of partly hydrogenated terphenyls, by transesterification between bicarboxylic aromatic acids and acetates or propionates of phenols and optionally of hydroxy acids, at temperatures ranging from 270 to 370° C., in order to make easier the complete development of the carboxylic aliphatic acids, by operating under vacuum as well.

Optionally the reaction can be carried out in the presence of a transesterification catalyst, such as, for instance, phosphates of alkaline or alkaline-earth metals.

Further catalysts can be the ones generally used in the polycondensation processes and illustrated in "Enciclopedia of Polymer Science and Technology" (1969, Vol. 10, pages 722–723).

Examples of such catalysts are: oxides, hydroxides, hydrides, halogenides, alcoholates or phenolates, salts and complex salts of organic or inorganic acids of lithium, sodium, potassium, magnesium, calcium, titanium, manganese, cobalt, zinc, tin, antimony, lanthanum, cerium, lead and germanium.

The required amount of catalyst ranges from 0.005% to 1% by moles and preferably from 0.01 to 0.2%, calculated on the global amount of the reagents.

According to an alternative method, the liquid crystalline aromatic polyesters, object of the present invention, can be obtained in solution, by polycondensation between the halides of the bicarboxylic aromatic acids and the mixture of phenols in a suitable solvent. The temperature ranges from 25 to 220° C. and the reaction is carried out in the presence of a base and/or of a nitrogen stream, in order to make easier the removal of the halogenidric acid.

Pyridine is the preferred base, whereas both the aliphatic and the aromatic chlorinates, such as methylene chloride, chlorobenzene, diohlorobenzenes and trichlorobenzenes are the particularly preferred solvents.

The thus obtained polymer is then recovered by evaporation of the solvent or by precipitation with a nonsolvent and successive filtration.

To better understand the present invention and to practically perform the same, a few illustrative, but not limitative examples are reported hereinafter.

EXAMPLE 1

2.115 g (10.42 mM) of terephthalic acid dichloride, 1.187 g (5.21 mM) of (alpha-phenylisopropyl)hydroquinone, 1.761 g (5.21 mM) of 3,3'-diphenyl-4,4'-dihydroxydiphenyl and 50 cc of 1,2,4-trichlorobenzene were introduced into a four-necked flask of the capacity of 100 cc, provided with mechanical stirrer, cooler and nitrogen inlet pipe, under a slight nitrogen stream.

The mixture was kept under stirring and under nitrogen stream for 20 minutes at room temperature, afterwards the temperature was increased to 220° C.

The mixture was kept at this temperature for 12 hours until the release of HCl was practically completed.

The mixture was allowed to cool while remaining under nitrogen.

When the reaction mixture was at 50° C., the gelatinous mass was poured into acetone and the formed precipitate was filtered.

The thus obtained polymer was washed with acetone (twice), with hot water, (twice) and acetone/methanol (twice).

The final product was dried under vacuum for 3 hours and 30 minutes at 170–180° C.

The dried polymers had a temperature of glass transition (Tg) OF 148° C., was partly crystalline and had a melting temperature of about 300° C.

The inherent viscosity was of 0.90 dl/g (measured at the temperature of 30° C. in a solvent consisting of trifluoroacetic acetic acid and methylene chloride in equal volumes at the concentration of 2.5 g/litre).

The melted polymer was optically anisotropic at the microscope with polarized light.

Then the polymer was annealed under nitrogen stream under the following conditions: 3 hours at 240° C., 1 hour and 30 minutes at 255° C. and finally 4 hours at 270° C.

After annealing the inherent viscosity was 1.90, the crystallinity had increased, whereas the melting temperature remained at about 300° C.

EXAMPLE 2

By using the same apparatus and working modalities of example 1, the following quantities were introduced: 2 115 (10.42 mM) of terephthalic acid dichloride, 0.969 g (5.21 mM) of phenylhydroquinone, 1.761 (5–21 mM) of 3,3'-diphenyl-4,4:-dihydroxydiphenyl and 50 cc of 1,2,4-trichlorobenzene.

The time required for the reaction of polymerization was 8 hours.

The final product was dried under vacuum for 3 hours and 30 minutes at 170° C.

The dried polymer had a Tg of 148° C. and a melting temperature of 290° C.

The inherent viscosity was of 2.85.

The molten polymer was optically anisotropic at the microscope with polarized light.

EXAMPLE 3

By using the same apparatus and working modalities of example 1, the following quantities were introduced: 2.188 g (10.78 mM) of terephthalic acid chloride, 1.154 g (5.39 mM) of (phenylethyl)hydroquinone, 1.821 g (5.39 mM) of 3,3'-diphenyl-4,4'-dihydroxydiphenyl and 50 cc of 1,2,4-trichlorobenzene.

The time for the reaction of polymerization was 8 hours.

The final product was dried under vacuum for 3 hours and 30 minutes at 170° C.

The dried polymer had a Tg of 148° C. and a melting temperature of 300° C.

The inherent viscosity was 2.80.

The melted polymer was optically anisotropic at the microscope with polarized light.

EXAMPLE 4

By using the same apparatus and working modalities of example 1, the following quantities were introduced: 2.115 g (10.42 mM) of terephthalic acid dichloride, 0.792 g (3.473 mM) of (alpha-phenylisopropyl)hydroquinone, 0.646 g (3.473 mM) of phenylhydroquinone, 1.173 g (3.473 mM) of 3,3'-diphenyl-4,4'-dihydroxydiphenyl and 50 cc of 1,2,4 trichlorobenzene.

The time for the reaction of polymerization was 9 hours.

The final product was dried under vacuum for 4 hours at 165° C.

The thus obtained polymer was amorphous, had a Tg of 150° and inherent viscosity of 0.60.

The polymer tested at the microscope with polarized light was optically anisotropic in the fluid state.

COMPARISON EXAMPLE

By using the same apparatus and working modalities of example 1 the following quantities were introduced: 2.115 g (10.42 mM) of terephthalic acid dichloride, 0.97 g (5.21 mM) of 4-4'-dihydroxydiphenyl, 1.761 g (5.21 mM) of 3,3'-diphenyl-4,4'-dihydroxydiphenyl and 50 cc of 1,2,4-dichlorobenzene.

The time for the reaction was 8 hours.

The final product was dried under vacuum for 3 hours and 30 minutes at 165° C.

The dried polymer was insoluble in the solvent used for the measurement of the inherent viscosity, had a crystallinity of 40% by volume and did not present any melting peak (Tm) by D.S.C. (Differential Scanning Calorimetry).

The polymer was tested at the microscope with polarized light and tended to melt over the decomposition temperature which was of about 450° C.

We claim:

1. A thermotropic liquid crystalline aromatic polyester comprising:
    (a) 30–90% by moles, with respect to the total of the aromatic diols, of a unit derived from 3,3'-diphenyl-4,4'-dihydroxydiphenyl of general formula:

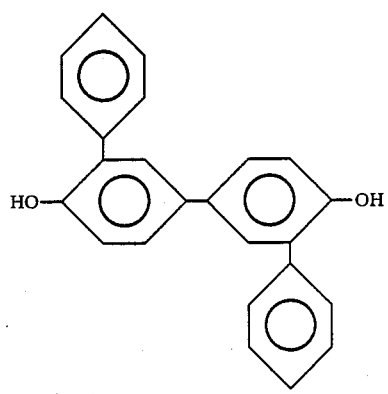

(1)

(b) 70–10% by moles, with respect to the total of the aromatic diols, of at least a unit derived from hydroquinones of general formula:

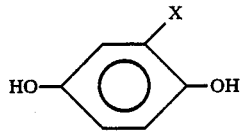 (2)

wherein X represents a halogen or an alkyl radical having from 1 to 6 carbon atoms, an aralkyl radical containing at least 7 carbon atoms, an aryl radical containing from 6 to 18 carbon atoms or a cycloalkyl radical containing from 6 to 12 carbon atoms;
(c) at least a unit derived from bicarboxylic acids of general formula:

$$HOOC-R_1-COOH \qquad (3)$$

wherein $R_1$ represents a cycloalkyl, a simple, double or condensed, aryl radical containing from 6 to 18 carbon atoms, optionally substituted with halogens or alkyl radicals having 1 to 6 carbon atoms;
(d) optionally at least a unit derived from hydroxyacids of general formula:

$$HO-AR_1-(CH=CH)_n-COOH \qquad (4)$$

wherein $Ar_1$ represents a simple, double or condensed aryl radical containing from 6 to 18 carbon atoms, optionally substituted with halogens, or alkyl radicals having 1 to 6 carbon atoms, and n is equal to zero or to 1.

2. A polyester according to claim 1, wherein the molar ratio between hydroxyacid and bicarboxylic acid ranges from 0 to 4.

3. A polyester according to claims 1 or 2, wherein at least 90% by moles of the bicarboxylic acids having the general formula (3) and of the hydroxacids having general formula (4) have the two functional groups such as to form the polymeric chain with substantially coaxial or parallel direction.

4. A polyester according to claim 1 or 2, wherein the unit derived from 3,3'-diphenyl-4,4'-dihydroxydiphenyl is present in amounts ranging from 30 to 60% by moles with respect to the total amount of the aromatic diols.

5. A polyester according to claim 1 or 2, wherein the hydroquinones of general formula (2) are selected from the class consisting of methyl, ethyl, propyl, t-butyl hydroquinone, phenyl hydroquinone, (1- phenylethyl)-hydroquinone, 1-(alpha-phenylisopropyl)hydroquinone, cyclohexylhydroquinone and chlorohydroquinone.

6. A polyester according to claim 1 or 2, wherein the bicarboxylic aromatic acids are selected from the class consisting of terephthalic acid, chloro, bromo terephthalic acid, methylterephthalic acid, 1,4-naphthalenedicarboxylic, 1,5-naphthalenedicarboxylic and 2,6-naphthalenedicarboxylic acids, 4,4'-diphenyldicarboxylic acid and 4,4'-stilbenecarboxylic acid.

7. A polyester according to claim 1 or 2, wherein the hydroxyacids are selected from the class consisting of p-hydroxybenzoci acid, 3-chloro-4-hydroxybenzoic acid, 3-methyl-4-hydroxybenzoic acid, 3,5-dichloro-4-hydroxybenzoic acid, 3-methyl-4-hydroxybenzoic acid, 3-t-butyl-4-hydroxybenzoic acid, 4-hydroxyl-1-naphthoic acid, 6-hydroxy-2-naphthoic acid, p-(4-hydroxyphenyl)benzoic acid and p-hydroxycinnamic acid.

8. A polyester according to claim 1 or 2, having an inherent viscosity, measured in 1/1 trifluoroacetic acid/methylene chloride mixture at 30° C. and at a concentration of 2.5 g/l, ranging from 0.3 to 4 dl/g.

9. A polyester according to claim 1 or 2, having a melting temperature ranging from 220 to 320° C.

10. A fibre, film, body formed by injection or by extrusion, or matrix for composite materials containing fibres or inorganic fillers, comprising a polyester of claim 1 or 2.

* * * * *